April 19, 1960 C. SCHUSTERIUS 2,933,586
ELECTRICAL HEATING APPLIANCES
Filed June 17, 1955 3 Sheets-Sheet 1
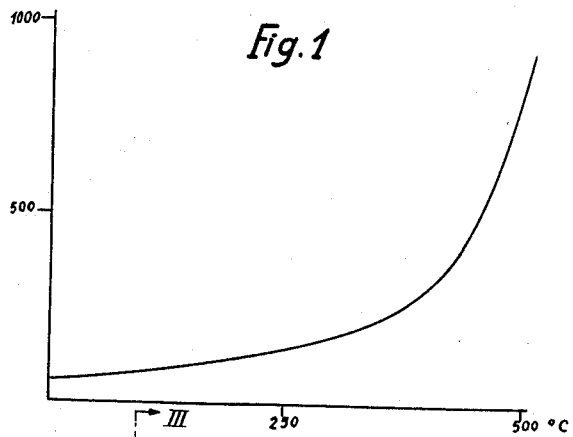
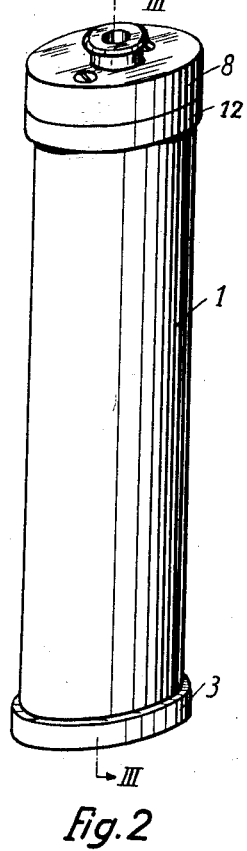
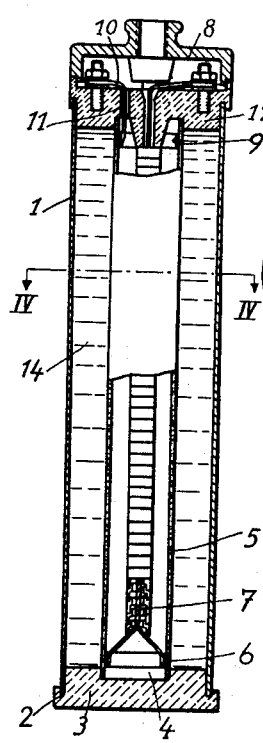
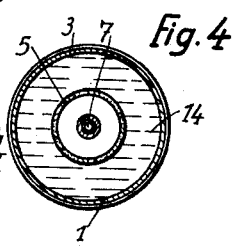
INVENTOR:
Carl Schusterius April 19, 1960   C. SCHUSTERIUS   2,933,586
ELECTRICAL HEATING APPLIANCES
Filed June 17, 1955   3 Sheets-Sheet 2

INVENTOR:
Carl Schusterius
By  Eric D. Frankel
Patent Agent

April 19, 1960 C. SCHUSTERIUS 2,933,586
ELECTRICAL HEATING APPLIANCES
Filed June 17, 1955 3 Sheets-Sheet 3

INVENTOR:
Carl Schusterius
By Eric D. Frankel
Patent Agent

United States Patent Office 2,933,586
Patented Apr. 19, 1960

2,933,586
ELECTRICAL HEATING APPLIANCES
Carl Schusterius, Konigshofen, Grabfeld, Unterfranken, Germany
Application June 17, 1955, Serial No. 516,128
11 Claims. (Cl. 219—25)

The present invention relates to electrical heating appliances for domestic or industrial use, and more particularly to a heating element consisting of an electrical semiconductor made of metal oxides and having a specific electrical resistance which increases as the temperature of the heating element increases.

It is one of the objects of the present invention to provide a heating element which is especially adapted for use in an electric hot-plate or immersion heater for heating liquids, or in electric irons, or similar household appliances.

Another object of the present invention is to provide an electrical heating conductor consisting of metal oxides, the electric conductivity of which, when connected to a source of electrical energy will gradually and continuously decrease as the temperature thereof increases until it has been heated to red heat.

Prior to this invention it has been customary for producing heat by an electric current to use metallic conductors, such as, for example, chrome nickel alloys, the electrical resistance of which has a low temperature coefficient, and wherein the low variability of the resistance of the heating circuit as the temperature and thus the amount of energy absorbed increases is regarded as a desired factor. Apparatus using such conductors are usually controlled either by regulating the amount of energy absorbed thereby or by controlling the temperature by means of a bimetallic circuit breaker which interrupts the flow of electric current when a certain preselected temperature is reached. Other metallic electrical conductors for heating appliances consist, for example, of pure nickel, the electrical resistance of which increases much more rapidly when the temperature increases than that of an alloy of nickel and iron or chromium. The temperature coefficient of the specific electrical resistance of metallic nickel amounts to about $+7 \cdot 10^{-3}$/per degree centigrade. This value increases as the temperature rises and becomes so large that pure nickel may be used as a control element for regulating the temperature of a heating circuit. Such control element may consist, for example, of a coil of pure nickel through which a secondary current is passed, the terminal voltage of which increases as the temperature increases and may be used for controlling the operation of a circuit breaker.

It has also been known prior to this invention to use non-metallic conductors for producing heat by electricity, such as, for example, silicon carbide and graphite. Both materials have a negative characteristic at room temperature and the dependency of their resistance upon the temperature does not become positive until they have been heated to higher temperatures of 400° to 800° C. Since their specific conductivity is relatively high, such heating appliances have the disadvantage that they may only be connected to the standard power supply voltages by means of regulating transformers, and further, that they also require an automatic temperature control by a thermocouple or a bimetallic strip.

The present invention, however, concerns a heating appliance, the heating element of which consists of a metal oxide, the electrical resistance of which has a positive temperature coefficient. Since the amount of electrical energy absorbed decreases at an increase in temperature, the heating conductor cannot be injured when overheated. The heating appliance according to the invention is therefore provided with a heating conductor which has a very high temperature coefficient. If this temperature coefficient amounts, for example, to 15% per degree centigrade of the value when cold, the absorption of energy of the heating appliance depends to a considerable extent upon the temperature of the heating conductor. If by contact with a cold object a certain amount of heat is withdrawn from the heating surface, the conductivity of the heating conductor increases accordingly and thus also in a linear dependency the amount of energy absorbed at a constant terminal voltage increases. The material to be heated thus increases its temperature very quickly, which, in turn, causes the heater temperature to rise and the absorption of energy to decrease. Such heating appliance thus by itself constitutes a temperature control device of purely electronic nature, that is, without application of any additional mechanical or electronic circuit breaker.

The heating conductor according to this invention preferably consists of a thin plate of ceramic material which is preferably made of zinc oxide. For a heating surface in the shape of a circular plate, it may have the form of a flat ring which at two or more points may be connected to an electric current by means of baked-in silver electrodes. Such oxide heating conductor has a positive resistance characteristic approximately up to a temperature at which it starts to become red hot, and such characteristic is especially prevalent at temperatures between 300° and 500° C. at a temperature coefficient of +30% per degree centigrade of the value when cold.

In a heating surface or hot plate of this type it is advisable that close attention be paid that a good heat contact exists between the heating conductor and the outer surface of the heating appliance. For this purpose, the present invention further consists in providing a thin, electrically insulating layer which separates the heating conductor from the outer wall of the heating appliance, and in preferably making such separating layer of beryllium oxide. If a lower heat conduction is desired, the insulating layer may also be made, for example, of magnesium oxide. However, the pulverized oxide to be used should be as densely sintered as possible. Beryllium oxide which is usually of very fine grain may be densely sintered or vitrified already at a temperature of 1400° C. if provided with a small addition of, for example, 0.1 mol. percent of rare earths, such as lanthanum oxide. The insulating oxide layer may either be applied as a powder or in the form of a plate. However, in place of such insulating oxide layer, thin sheets of mica may also be used. If the operating temperature of the appliance is lower than, for example, 300° C., a heat retaining liquid, such as a silicon oil, has proved very valuable as a heat transfer agent between the oxide semiconductor and the outer metallic cover of the appliance.

The method of production and shaping of the oxide semi-conductors requires close attention. Heating conductors of zinc oxide with additions of 2 to 8% by weight of magnesium oxide, 0.5 to 3% by weight of nickel oxide, 4 to 12% by weight of titanium oxide, and .01 to 1% by weight of zirconium oxide have proved very successful, for example, for heating appliances and apparatus which require greatest sensitivity between temperatures of 200° to 500° C. Such heating conductors before being installed in the respective heating appliance or apparatus should be subjected to a heat treatment in an oxygen atmosphere or in one containing oxygen, which consists in slowly cooling the same from a temperature of, for example, 1200° C. to one of about 500° C.

Further objects, features, and advantages of the present invention will be apparent from the following detailed description which is to be read with reference to the accompanying drawings of several specific embodiments of the invention, in which Fig. 1 shows a curve illustrating the dependency of the specific electrical resistance upon the temperature;

Fig. 2 shows a front view of a tubular heating element according to the invention;

Fig. 3 shows a cross section taken along line III—III of Fig. 2;

Fig. 4 shows a cross section taken along line IV—IV of Fig. 3;

Fig. 9 shows a cross section taken along line IX—IX of Fig. 8; while

Figure 5:
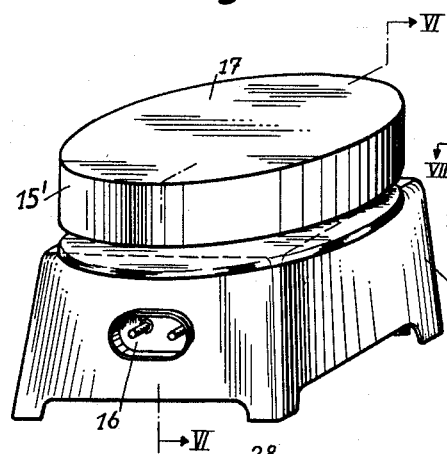
Fig. 5 shows a front view in perspective of an electric hot plate according to the invention.

Referring to the drawings, Fig. 1 illustrates the dependency of the specific electrical resistance upon the temperature. In this drawing, the temperature has been plotted along the abscissa, while the ordinate shows the ohmic resistance per cm. This curve which is applicable to those chemical compounds as are applied for making the heating conductors according to the invention, shows that as the temperature increases, also the resistance increases. Thus, in the example illustrated, the resistance curve shows a steep ascent at a temperature of about 400° C., which means that if the temperature of the heating conductor to which this curve relates rises to a value of over 400° C., the resistance thereof increases to such an extent that, because of the steep ascent of the resistance value, the rate of energy absorbed decreases. Thus, around such temperature a state of equilibrium will occur which, however, will shift as soon as heat is withdrawn from such heating element. A specific example of the composition of the material given above which results in the characteristic curve according to Fig. 1 is substantially as follows:

| | Percent |
|---|---|
| Zinc oxide | 85 |
| Magnesium oxide | 4 |
| Nickel oxide | 2 |
| Titanium oxide | 8 |
| Zirconium oxide | 1 |

Heating elements of such a composition are particularly suitable for use in electric appliances as shown in the drawings. A simple tubular heater which may be used for various purposes has been illustrated in Figs. 2 to 4. It consists of a tubular metallic cover or jacket 1 which is closed at its lower end 2 above which a supporting member 3, preferably of a ceramic material, is mounted in the jacket 1. The supporting member 3 is provided with a suitable recess or slot 4 which supports one end of a tubular heating element 5 which consists of a material as described above. The lower end 6 of the heating element 6 is preferably silver-plated and a metallic wire 7 is connected thereto and mounted so as to extend through the heating element 5 is likewise provided with a silver plating 9 to which the other wire 10 is connected. This other end of heating element 5 is likewise fitted into a slot or recess 11 in a ceramic supporting member 12. The head of the outlet 8 may be secured to the wall of jacket 1 and/or the ceramic supporting member 12 by a suitable heat-resistant cement. The space intermediate the heating element 5 and the jacket 1 is preferably filled with a suitable heat transmitting agent 14 which may consist, for example, of a silicon oil or a pulverized oxide.

Figure 6:
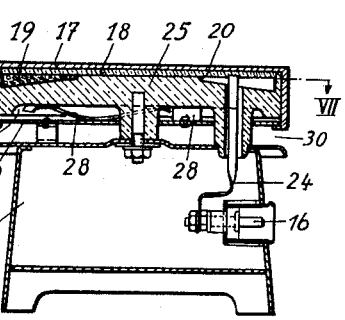
Fig. 6 shows a cross section taken along line VI—VI of Fig. 5.
Figure 7:
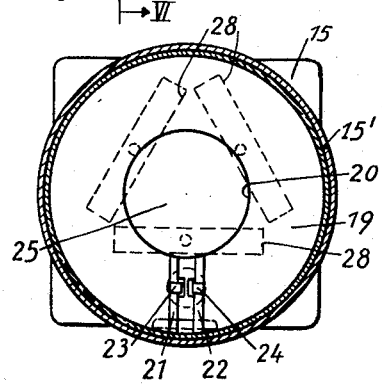
Fig. 7 shows a cross section taken along line VII—VII of Fig. 6.

Figs. 5 to 7 illustrate the present invention as being applied to an electric hot plate 15 which is provided with an electric outlet 16 and a metal plate 17 upon which a cooking utensil may be placed. Metal plate 17 is preferably made integral with the outer wall 15, thus forming a single inverted pot-shaped element. Below the metal plate 17 a layer of beryllium oxide 18 is provided and below such layer a ceramic heating element 19 according to the invention which has a positive temperature coefficient. As illustrated in Figs. 6 and 7, this heating element 19 is made of annular shape having a central aperture 20 and preferably increases in thickness toward its periphery so as to compensate for the greater loss of heat at such points. Similarly as described relative to the first embodiment as shown in Fig. 3 the two ends 21 and 22 of the heating element 19 are provided with a silver coating to which lead wires 23 and 24 are secured which are then connected to the outlet 16. Below the ceramic heating element 19 and supporting the same is an element 25 consisting of a porous ceramic material, for example, of a porous clay substance, which is molded so as to enclose the annular heating element peripherally thereof, and to have a recessed portion 27 at its lower side. A plate 29 which is secured to the inside of the outer wall 15 forms the support of the insulating element 25 and a plurality of springs 28 are mounted thereon and within the recess 27 so as to urge the element 25 into firm engagement with the heating element 17. Openings 30 are finally provided in the outer wall 15 so as to permit any excess heat to escape.

Figure 8:
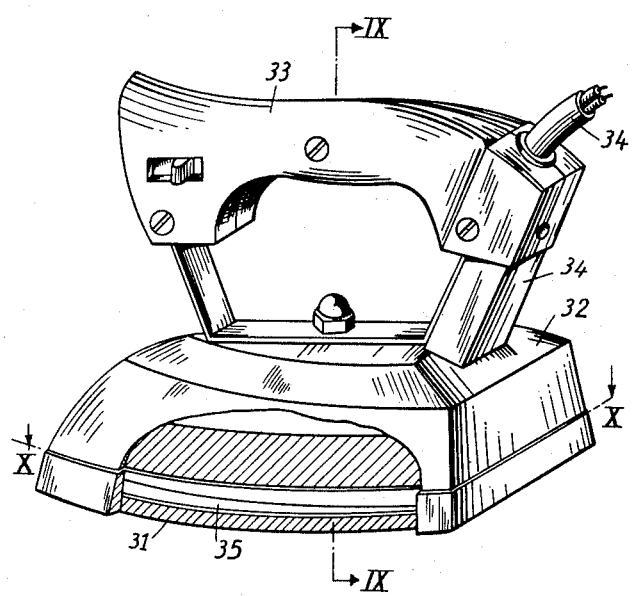
Fig. 8 shows a side view of an electric iron according to the invention, partly broken away to show the inside thereof.
Figure 9:
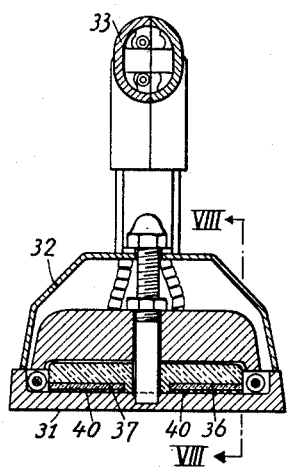
Figure 10:
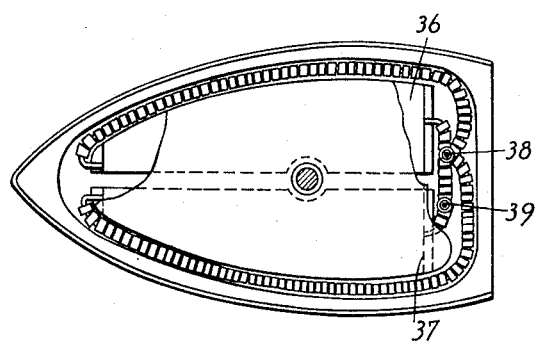
Fig. 10 shows a cross section taken along line X—X of Fig. 8.

Figs. 8 to 10 illustrate the application of the invention to an electric iron. It consists of the customary ironing base plate 31 and the cover 32 on which a handle 33 is mounted. Cover 32 also carries the electric outlet 34 which is conected to a heating element 35 which is composed of a ceramic material having a positive temperature coefficient, as previously described. This heating element 35 is made in the shape of a plate which may be substantially U-shaped or, as shown in Fig. 10, consist of two parts 36 and 37 which are electrically connected with each other by connecting wires 38 and 39 which, in turn, lead to the outlet 34.

The two heating plates 36 and 37 are insulated from the base plate 31 by a layer 40 of mica, while above they are covered by a layer 41 of porous ceramic material. Also in this embodiment of the invention, as illustrated in Fig. 8, the thickness of the ceramic heating element 35 increases toward the front end or tip thereof, in order to compensate for the decrease in material in a lateral direction due to the more or less pointed shape thereof and to provide a uniform heat distribution over the entire surface of base plate 31.

The present invention is a further development of applicant's invention according to his copending U.S. application Serial No. 493,545, filed March 10, 1955, now U.S. Patent No. 2,892,988.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. In an electrical heating appliance, a heating element comprising a compact sintered ceramic body of a semi-conductive mixture of at least 70% of zinc oxide and the remainder consisting of a mixture of other metal oxides, said mixture containing oxides of metals selected from the group consisting of titanium, nickel, magnesium, and zirconium, the resistivity of said body having a positive temperature coefficient with the mean value of $50 \cdot 10^{-3}$ to $200 \cdot 10^{-3} /°$ C. within the temperature range between 0° and 500° C.

2. In an electrical heating appliance as defined in claim 1 wherein said ceramic body comprises a substantially flat annular member having a gap extending substantially radially thereof so as to form two adjacent ends, and lead-in terminals electrically connected to said ends.

3. In an electrical heating appliance as defined in claim 1, wherein said ceramic body comprises a substantially flat annular member increasing in thickness toward its outer periphery and having a gap extending substantially radially thereof so as to form adjacent ends, an insulating element enclosing said annular member at least at the bottom and the outer periphery thereof, a metal cover substantially enclosing said ceramic body and insulating element on all sides and comprising an upper and a lower plate, said upper plate being spaced closely adjacent to said ceramic body and forming an outer heating surface, spring means interposed between said lower plate and said insulating element for pressing said insulating element and said ceramic body into firm engagement with said upper plate, and lead-in terminals on said outer cover and electrically insulated therefrom, said terminals being electrically connected to said adjacent ends of said ceramic body, respectively.

4. In an electrical heating appliance as defined in claim 1, further an elongated metallic base plate forming an ironing surface with its sides gradually converging toward one end, a layer of mica on said base plate, said ceramic body comprising a pair of substantially flat elongated members mounted side-by-side but spaced from each other on said mica layer, said members gradually increasing in thickness toward said converging end of said base plate, an insulating member of ceramic material substantially enclosing said ceramic body laterally and along its upper surface, an outer cover mounted on said base plate and fully enclosing said ceramic body and insulating member, an electrical outlet mounted on said cover and electrically connecting said two members of said ceramic body with each other and with said outlet.

5. In an electrical heating appliance as defined in claim 1, further an elongated tubular metallic housing having open ends, a ceramic insulating member closing each end of said housing and each having a recess therein toward the inside of said housing, said ceramic body comprising an elongated tube of smaller diameter than said housing, the opposite ends of said tube being mounted within said recesses of said insulating members, two lead-in terminals mounted on at least one of said insulating members and electrically connected to the opposite ends of said tube, respectively, and an electrical insulating material having a high heat conductivity interposed between said tube and the inner surface of said housing.

6. In an electrical heating appliance according to claim 1, said mixture containing additions of 2 to 8% by weight of magnesium oxide, 0.5 to 3% by weight of nickel oxide, 4 to 12% by weight of titanium oxide and 0.01 to 1% by weight of zirconium oxide.

7. In an electrical heating appliance according to claim 1, said positive temperature coefficient exceeding the value of $7 \cdot 10^{-3} /°$ C. at 50° C.

8. In an electrical heating appliance according to claim 1, a layer of electrically insulating, but heat-conducting material on said ceramic body, said layer comprising a mixture containing predominantly beryllium oxide also including rare earth.

9. In an electrical heating appliance according to claim 8, said layer comprising a mixture containing 90 to 99% of beryllium oxide and 10 to 1% of lanthanum oxide.

10. In an electrical heating appliance according to claim 8, said layer comprising thin sheets of mica.

11. In an electrical heating appliance according to claim 8, said layer comprising predominantly a silicon oil having high heat-conductive properties.

References Cited in the file of this patent

UNITED STATES PATENTS

| | | |
|---|---|---|
| 648,518 | Ochs | May 1, 1900 |
| 1,438,936 | Einer | Dec. 12, 1922 |
| 2,091,107 | Reichmann | Aug. 24, 1937 |
| 2,215,587 | Kershbaum | Sept. 24, 1940 |
| 2,258,646 | Grisdale | Oct. 14, 1941 |
| 2,414,793 | Becker et al. | Jan. 28, 1947 |
| 2,564,677 | Davis | Aug. 21, 1951 |
| 2,673,917 | Woodling | Mar. 30, 1954 |
| 2,680,771 | Kistler | June 8, 1954 |
| 2,892,988 | Schusterius | Jan. 30, 1959 |